United States Patent
Fukuda (10) Patent No.: US 9,030,690 B2
(45) Date of Patent: May 12, 2015

(54) IMAGE FORMING APPARATUS CAPABLE OF CHANGING EXECUTION ORDER OF JOBS, METHOD OF CONTROLLING IMAGE FORMING APPARATUS, AND STORAGE MEDIUM

(71) Applicant: Canon Kabushiki Kaisha, Tokyo (JP)

(72) Inventor: Shin Fukuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/282,012

(22) Filed: May 20, 2014

(65) Prior Publication Data

US 2014/0355031 A1  Dec. 4, 2014

(30) Foreign Application Priority Data

May 30, 2013  (JP) ................................. 2013-114183

(51) Int. Cl.
*G06K 15/00* (2006.01)
*G06F 3/12* (2006.01)

(52) U.S. Cl.
CPC .............. *G06F 3/121* (2013.01); *G06K 15/005* (2013.01); *G06K 15/408* (2013.01); *G06K 15/4065* (2013.01); *G06K 15/407* (2013.01); *G06F 3/1263* (2013.01)

(58) Field of Classification Search
None
See application file for complete search history.

(56) References Cited

U.S. PATENT DOCUMENTS

| | | | |
|---|---|---|---|
| 6,785,727 B1 * | 8/2004 | Yamazaki | 709/229 |
| 2003/0076525 A1 * | 4/2003 | Hikawa | 358/1.14 |
| 2004/0196497 A1 * | 10/2004 | Klassen et al. | 358/1.15 |
| 2006/0023240 A1 * | 2/2006 | Natori | 358/1.13 |
| 2009/0307342 A1 * | 12/2009 | Matsuda et al. | 709/223 |

FOREIGN PATENT DOCUMENTS

JP  2004-330781 A  11/2004

* cited by examiner

*Primary Examiner* — Jeremiah Bryar
(74) *Attorney, Agent, or Firm* — Rossi, Kimms & McDowell LLP

(57) ABSTRACT

An image forming apparatus capable of changing the execution order of jobs to thereby suppress occurrence of downtime caused when an operator cannot replenish or replace a consumable. A print queue manages the execution order of jobs. A paper-out prediction section predicts a time at which replenishment or replacement of a consumable to be consumed by the execution of the jobs becomes necessary. An operator absence schedule input section receives an input of a time period during which an operator who is to replenish or replace the consumable cannot replenish or replace the consumable. A job order automatic changing section changes the execution order of the jobs such that the predicted time will not come during the time period, when possible.

9 Claims, 11 Drawing Sheets

| | PRINTING ORDER | | | PAPER-OUT DURING ABSENCE TIME OF OPERATOR |
|---|---|---|---|---|
| | 1 | 2 | 3 | |
| 702 — 1 | Job2 | Job4 | Job3 | NOT CAUSED |
| 703 — 2 | Job3 | Job2 | Job4 | CAUSED |
| 704 — 3 | Job3 | Job4 | Job2 | NOT CAUSED |
| 705 — 4 | Job4 | Job2 | Job3 | NOT CAUSED |
| 706 — 5 | Job4 | Job3 | Job2 | NOT CAUSED |

IMAGE FORMING APPARATUS CAPABLE OF CHANGING EXECUTION ORDER OF JOBS, METHOD OF CONTROLLING IMAGE FORMING APPARATUS, AND STORAGE MEDIUM

BACKGROUND OF THE INVENTION

1. Field of the Invention

The present invention relates to an image forming apparatus capable of changing the execution order of jobs, a method of controlling the image forming apparatus, and a storage medium.

2. Description of the Related Art

In a printing market, which is called the print-on-demand (POD) market or the production market, a form of business is adopted in which printing is performed according to an order placed by a customer and then a print product is reliably delivered to the customer on or before desired delivery date.

In a job site in the printing market, it is very important to perform large-amount printing speedily. For this reason, in many cases, an operator who performs various operations on a printing apparatus as a specialist is assigned to the job site.

The operator as a specialist performs replenishment/replacement of consumables, such as sheets and toner, job management, job ticket editing, conveyance of printed sheets, and post processing of printed sheets, such as cutting and bookbinding.

Replenishment/replacement of consumables is a most important task among operator operations, because when replenishment/replacement of consumables is not properly performed, the printing apparatus is brought into a state where a consumable necessary for printing runs out during execution of a print job.

In such a case, the printing apparatus has to temporarily stop its print engine to suspend a printing process. When the printing process is suspended, printing cannot be restarted until replenishment/replacement of consumables necessary for printing is completed. Further, reheating of the print engine and the like processing are executed after restart of the printing, and hence long downtime occurs before the printing apparatus becomes capable of executing printing again.

Therefore, as a method of enabling the operator to take necessary steps before occurrence of downtime, there has been disclosed a technique in which, in a graph indicating predicted printing times on a job-by-job basis, a portion indicating a time period during which downtime is predicted to occur is displayed using a different color (see e.g. Japanese Patent Laid-Open Publication No. 2004-330781).

According to the above-described conventional technique, however, although the operator can grasp in advance when it becomes necessary to perform an operation for replenishing/replacing consumables, there can be a case where the operator has to leave the printing site at a time during which it becomes necessary to perform the operation, due to another activity or a meeting or for some other reason.

In this case, although it is possible to shift timing of occurrence of downtime by replenishing/replacing sufficient consumables before the operator leaves the printing site, it is not always possible to replenish/replace sufficient consumables before the operator leaves the printing site.

For example, in cases where it takes time to acquire a necessary consumable, where the number of sheets necessary for printing is larger than the number of sheets which can be contained in a sheet feeder, and where the number of necessary sheet types is larger than the number of sheet feeders, it is impossible to replenish or replace the consumable instantly, and hence it is supposed that the operator leaves the printing site without replenishing or replacing the consumable.

Even in such a case, as another method of shifting timing of occurrence of downtime, if the operator changes the execution order of jobs, it is sometimes possible to prevent a consumable from running out when the operator is absent from the printing site. That is, by changing the printing order of jobs such that jobs which will consume the consumable predicted to run short are advanced or delayed, the consumable is prevented from running out when the operator is absent from the printing site.

However, it costs the operator much time and labor for manually changing the execution order of jobs, because the operator is required to change the execution order of jobs after grasping which job uses which consumable.

Further, it is necessary to take into account influence of changing the order on other jobs than the job whose place in the order is intended to be changed, since a change in the place of one job in the order can cause another job to run out of a consumable, for example.

Particularly, in a case where the number of input jobs is larger, or in a case where the operator leaves the printing site for a long time period or a plurality of times, it is necessary to perform changing the execution order of jobs by trial and error until it is properly changed, which costs the operator much time and labor.

SUMMARY OF THE INVENTION

The present invention provides an image forming apparatus which is capable of changing the execution order of jobs, and suppressing occurrence of downtime caused due to an operator's incapability of replenishing or replacing a consumable, a method of controlling the image forming apparatus, and a storage medium.

In a first aspect of the present invention, there is provided an image forming apparatus comprising a time prediction unit configured to predict a time period required from start to completion of execution of each of jobs, a queue management unit configured to manage an execution order of the jobs, a time prediction unit configured to predict a time at which replenishment or replacement of a consumable to be consumed by the execution of the jobs becomes necessary, an input unit configured to have a time period input thereto during which an operator who is to replenish or replace the consumable cannot replenish or replace the consumable, and an order changing unit configured to, when it is possible to change the execution order of the jobs managed by the queue management unit such that the time predicted by the time prediction unit will not come during the time period input via the input unit, change the execution order of the jobs such that, the predicted time will not come during the input time period.

In a second aspect of the present invention, there is provided a method of controlling an image forming apparatus, comprising predicting a time period required from start to completion of execution of each of jobs, managing an execution order of the jobs, predicting a time at which replenishment or replacement of a consumable to be consumed by the execution of the jobs becomes necessary, having a time period input during which an operator who is to replenish or replace the consumable cannot replenish or replace the consumable, and changing, when it is possible to change the execution order of the jobs managed by said managing such that the time predicted by said predicting will not come during the input time period, the execution order of the jobs such that the predicted time will not come during the input time period.

In a third aspect of the present invention, there is provided a non-transitory computer-readable storage medium storing a computer-executable program for causing a computer to execute a method of controlling an image forming apparatus, wherein the method comprises predicting a time period required from start, to completion of execution of each of jobs, managing an execution order of the jobs, predicting a time at which replenishment or replacement of a consumable to be consumed by the execution of the jobs becomes necessary, having a time period input during which an operator who is to replenish or replace the consumable cannot replenish or replace the consumable, and changing, when it is possible to change the execution order of the jobs managed by said managing such that the time predicted by said predicting will not come during the input time period, the execution order of the jobs such that the predicted time will not come during the input time period.

According to the image forming apparatus, the method of controlling the image forming apparatus, and the storage medium of the present invention, when it is possible to change the execution order of jobs such that a predicted time at which replenishment or replacement of a consumable becomes necessary will not come during a time period designated by an operator during which the operator cannot replenish or replace the consumable, the execution order of the jobs is changed such that the predicted time will not come during the designated time period, and therefore it is possible to suppress occurrence of downtime caused when the operator cannot replenish or replace the consumable.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
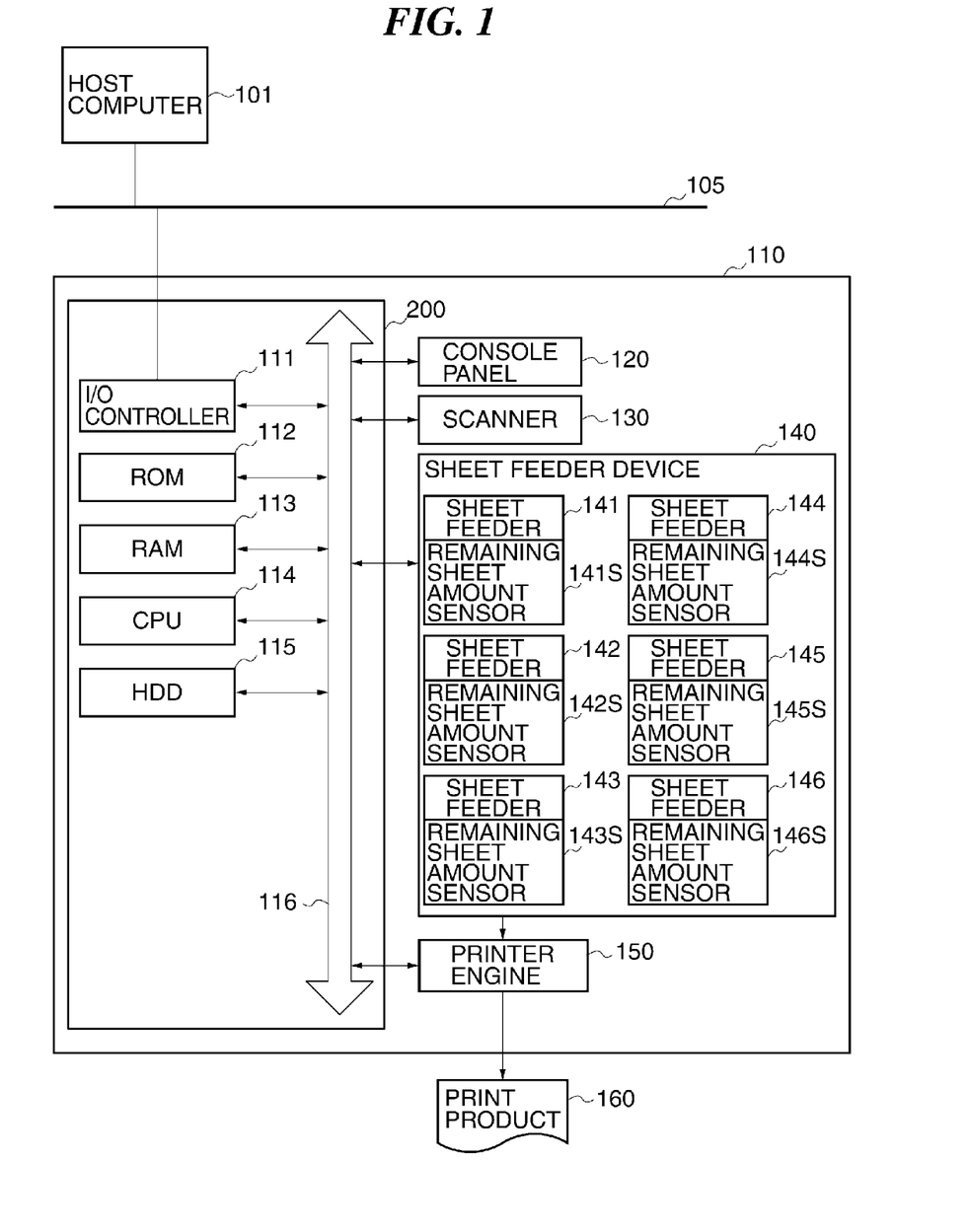
FIG. 1 is a schematic block diagram of an image forming apparatus according to a first embodiment of the present invention.

FIG. 1 is a schematic block diagram of an image forming apparatus 110 according to a first embodiment of the present invention.

FIG. 1 shows an example of a case where the image forming apparatus 110 is connected to a host computer 101 via a communication line 105.

The image forming apparatus 110 comprises a controller box 200, a console panel 120, a scanner 130, a printer engine 150, and a sheet feeding device 140.

The controller box 200 controls the overall operation of the image forming apparatus 110. The console panel 120 receives various operations from a user, and displays information to the user.

The scanner 130 scans an original using an optical sensor to thereby acquire image data. The sheet feeding device 140 is equipped with a plurality of sheet feeders. The printer engine 150 physically prints image data on a print sheet, and outputs a print product 160.

Next, a description will be given of the configuration of the controller box 200. The controller box 200 comprises an input/output (I/O) controller 111, a ROM 112, a RAM 113, a CPU 114, and an HDD 115.

The input/output controller 111 controls communication with an external network. The ROM (read only memory) 112 stores various kinds of control programs. The RAM (random access memory) 113 stores programs and various kinds of data stored in the ROM 112 and the HDD 115, and is used as a work area for the CPU 114.

The CPU 114 executes the control programs stored in the RAM 113, and performs centralized overall control of image signals and various kinds of devices. The HDD 115 stores large-volume data, such as image data and print data, temporarily or on a long term basis, and stores software programs, described hereinafter. The programs stored in the HDD 115 are loaded in the RAM 113, and are executed by the CPU 114.

The above-described sections of the controller box 200, the console panel 120, the scanner 130, the printer engine 150, and the sheet feeding device 140 are connected to each other by a system bus 116.

The control programs and an operating system are stored not only in the ROM 112 but also in the HDD 115. The controller box 200 may be provided with a NVRAM (non-volatile RAM), not shown, for storing various kinds of configuration information input from the console panel 120.

The sheet feeding device 140 comprises a plurality of sheet feeders for containing print sheets. FIG. 1 shows six sheet feeders 141, 142, 143, 144, 145, and 146, by way of example. The sheet, feeders forming the sheet feeding device 140 include not only these sheet feeders provided in the printing apparatus 110 but also an external sheet feeder as an option and a manual sheet feeder (neither of which is shown).

Each sheet feeder contains print sheets, and separately conveys only an uppermost one of the contained sheets to the printer engine 150.

Further, in the present embodiment, the sheet feeders 141, 142, 143, 144, 145, and 146 are equipped with remaining sheet amount sensors 141S, 142S, 143S, 144S, 145S, and 146S, respectively, each of which is capable of detecting a remaining amount of sheets in an associated sheet feeder. As described above, although in the present embodiment, sheets will be described as an example of a consumable consumed by execution of jobs, the present embodiment can be applied to other consumables, such as toner, ink, staples, bookbinding pastes, and binders, insofar as remaining amounts thereof can be detected.

Note that when sheets have run out, they are replenished, and when toner or ink has run out, a cartridge thereof is replaced. As described above, although in the present embodiment, a time at which sheets run out is described as an example of a time at which replenishment or replacement of a consumable to be consumed by execution of jobs becomes necessary, the time is not necessarily limited to the time at which sheets run out (paper out is caused), but may be a time at which the number of remaining sheets becomes e.g. ten.

Figure 2:
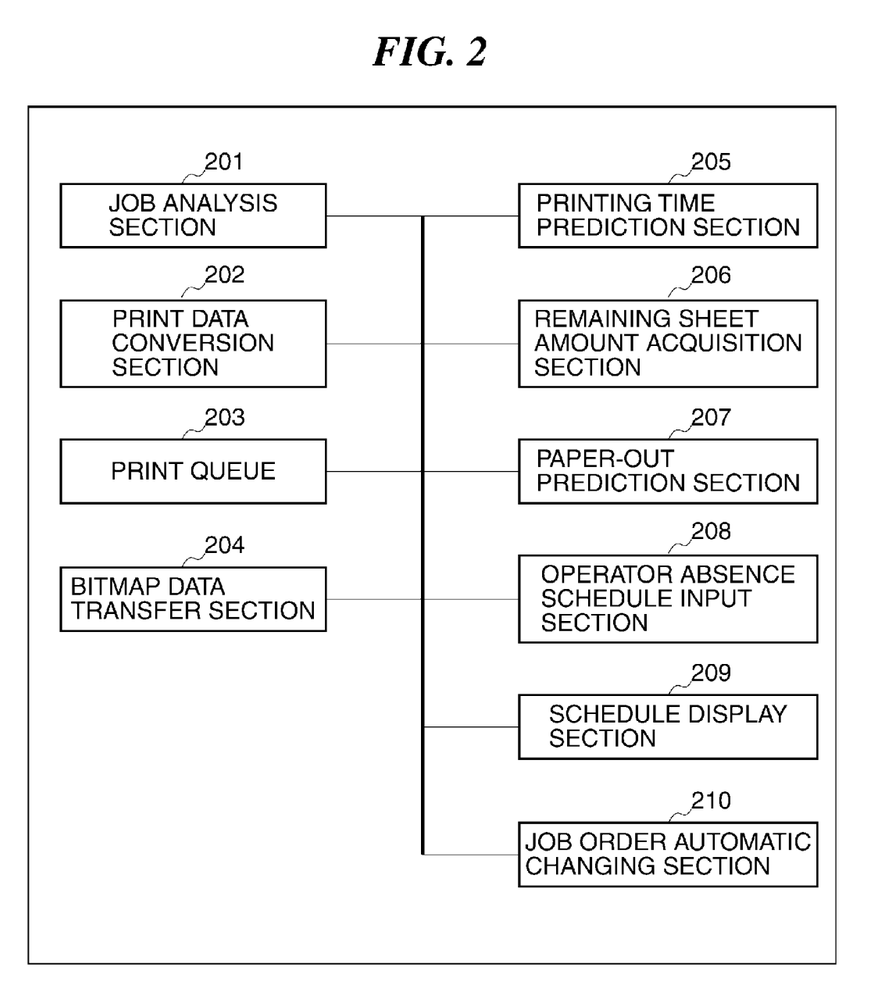
FIG. 2 is a block diagram of the software configuration of the image forming apparatus shown in FIG. 1.

FIG. 2 is a block diagram of the software configuration of the image forming apparatus 110 shown in FIG. 1.

Referring to FIG. 2, the software of the image forming apparatus 110 comprises a job analysis section 201, a print data conversion section 202, a print queue 203, a bitmap data transfer section 204, a printing time prediction section 205, a remaining sheet amount acquisition section 206, a paper-out prediction section 207, an operator absence schedule input section 208, a schedule display section 209, and a job order automatic changing section 210.

The job analysis section 201 analyzes various kinds of job data received by the image forming apparatus 110, including job data sent from the host computer 101, for executing print jobs, and job data generated by the image forming apparatus 110, for executing copy jobs, and reads out print settings included in the job data.

The above-mentioned print settings indicate information on a size and a type of sheets to be used for printing, information on sheet feeding, such as sheet feeders, information on printing, such as single-sided printing or double-sided printing, and information on finishing processing, such as settings for stapling and bookbinding.

The print settings read out by the job analysis section 201 are temporarily stored in a storage device, such as the RAM 113 or the HDD 115.

The print data conversion section 202 converts image data contained in each of the various kinds of jobs received by the image forming apparatus 110 to bitmap data printable by the printer engine 150. Print image data sent from the host computer 101 is generally written in PDD (page description language), and PDL data is converted to bitmap data.

In a case where image data has been converted to bitmap data in advance e.g. in the host computer 101, the print data conversion section 202 performs only color conversion in which the image data is converted to color space data compatible with the printer engine 150.

In the case of a copy job generated by the image forming apparatus 110, image data read by the scanner 130 is converted to bitmap data. The bitmap data generated by the print data conversion section 202 is temporality stored in the storage device, such as the HDD 115.

All the jobs received by the image forming apparatus 110 are processed by the job analysis section 201 and the print data conversion section 202, and at the same time, information on each job is sent to the print queue 203 where the jobs are managed in a centralized manner.

In the print queue 203, the printing order (execution order) of the managed jobs is controlled, and the jobs are sequentially subjected to printing in the printing order. The jobs already subjected to printing are deleted from the print queue 203. The print queue 203 corresponds to a queue management unit configured to manage the execution order of jobs.

The bitmap data transfer section 204 transfers bitmap data generated by the print data conversion section 202 to the printer engine 150 at timing of conveyance of a sheet from the sheet feeding device 140 to the printer engine 150.

The printing time prediction section 205 predicts not only printing time taken to complete execution of a job but also printing time, when a page group composed of a plurality of pages is to be printed, taken to complete printing of the page group. Prediction of printing time is performed using print settings of a job read out by the job analysis section 201 and the throughput of the printer engine 150. The above-described printing time prediction section 205 corresponds to a time prediction unit configured to predict a time period required from the start to end of execution of a job.

The throughput of the printer engine 150, mentioned here, is indicated by a print speed, processing time required for switching between sizes and types of sheets, processing time required for various engine adjustments and cleaning, processing time required for finishing processing, and so forth.

The remaining sheet amount acquisition section 206 communicates with the sheet feeding device 140, and acquires information on a sheet size, a sheet type, and a remaining amount of sheets, set for each sheet feeder. The acquired information is temporarily stored in the storage device, such as the RAM 113 or the HDD 115.

The paper-out prediction section 207 predicts, for each type of sheets used in a job managed by the print queue 203, a time at which paper-out will be caused (sheets will run out), in a case where it is determined that paper-out will be caused during printing of the job. Determination of whether or not paper-out will be caused is performed by comparing the amount of sheets to be used in the job and the remaining amount of sheets which is acquired by the remaining sheet amount acquisition section 206.

Further, when it is determined that paper-out will be caused, the paper-out prediction section 207 predicts a time at which paper-out will be caused, using the printing time prediction section 205. The paper-out prediction section 207 corresponds to a time prediction unit configured to predict a time at which replenishment or replacement of a consumable to be consumed by execution of the jobs becomes necessary.

The operator absence schedule input section 208 receives an input of an absence schedule from an operator. An example of a screen of the operator absence schedule input section 208 will be described hereinafter. The operator absence schedule input section 208 corresponds to an input unit configured to receive a time period in which the operator who is to replenish or replace a consumable cannot replenish or replace the consumable.

Although in the present embodiment, absence of the operator is used as an example of the case where the operator cannot replenish or replace a consumable, this is not limitative. For example, there can be a case although the operator is not absent, it is sometimes impossible to replenish or replace sheets due to delayed delivery of ordered sheets. The present invention can also be applied to such a case.

The schedule display section 209 displays a schedule screen on the console panel 120. The schedule screen mentioned here refers to an interface screen for displaying an order in which jobs managed by the print queue 203 are to be printed, and a time period during which printing of each job is to be executed.

The schedule display section 209 also displays an absence schedule of the operator which has been input by the operator absence schedule input section 208. Examples of the screen of the schedule display section 209 will be described hereinafter.

The job order automatic changing section 210 corresponds to an order changing unit configured to change the execution order of jobs such that a predicted time at which paper-out is predicted to be caused will not come during a time period designated by the operator, if it is possible to change the execution order of the jobs managed by the print queue 203.

Specifically, the job order automatic changing section 210 automatically changes the order in which the jobs managed by the print queue 203 are printed, using a job order-changing table, described hereinafter.

Figure 3A:
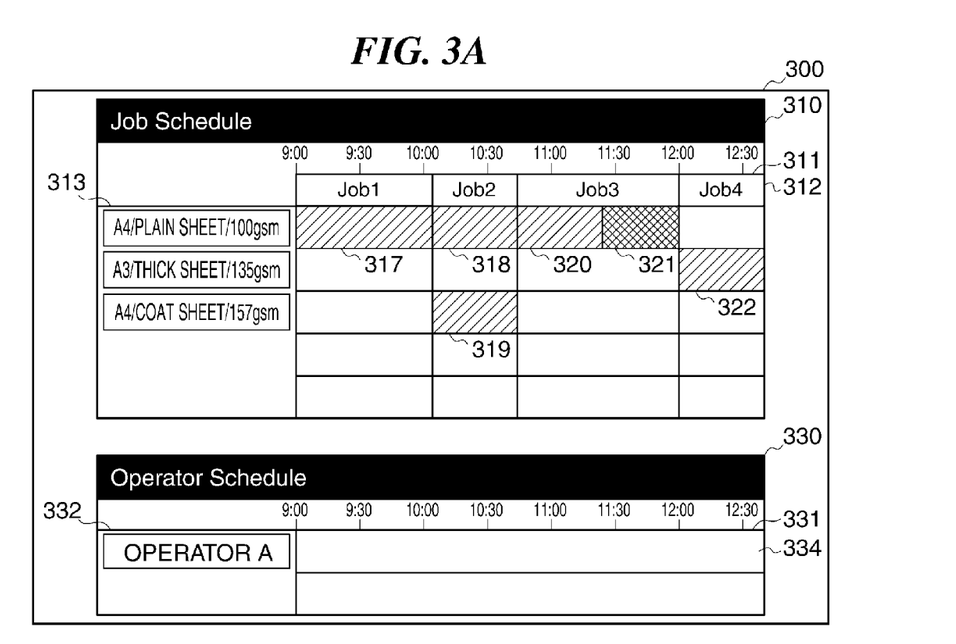
FIG. 3A is a view of a schedule screen displayed on a console panel in FIG. 1.
Figure 3B:
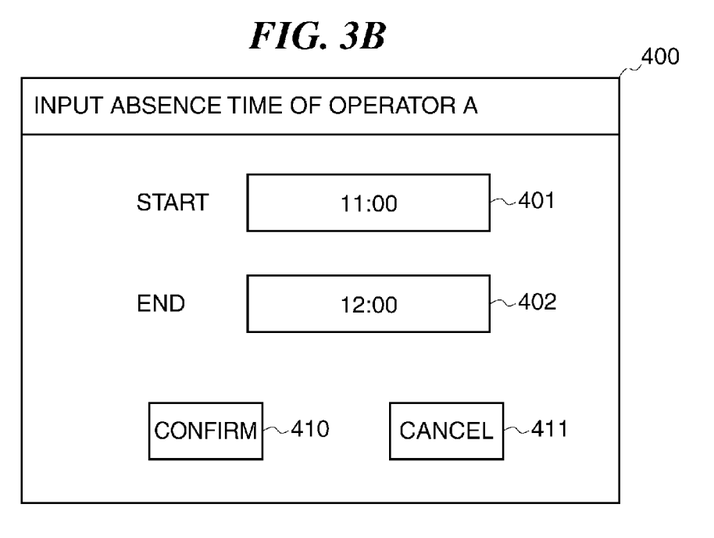
FIG. 3B is a view of a dialog screen for inputting an absence schedule of an operator, displayed on the console panel in FIG. 1.

FIG. 3A shows the schedule screen, denoted by reference numeral 300, which is displayed on the console panel 120 appearing in FIG. 1, and FIG. 3B shows a dialog screen 400 also displayed on the console panel 120, for prompting the operator to enter his/her absence schedule.

In FIG. 3A, a job schedule 310 indicates a schedule of jobs managed by the print queue 203.

In the job schedule 310, a horizontal line 311 represents time with tick marks indicative of time points. A row 312 indicates the execution order of jobs which are to be executed, and time periods of execution of the jobs, which can be known from tick marks of the horizontal line 311.

In FIG. 3A, there is illustrated an order in which Job 1 to Job 4 are to be printed, and time periods during which the jobs are to be printed, respectively. The displayed time periods shown in FIG. 3A change in length according to printing time periods predicted by the printing time prediction section 205.

The operator can refer to the horizontal line 311 and the row 312 to thereby check the predicted start time and predicted end time of execution of each job.

A column 313 displays sheets to be consumed in printing of the jobs displayed in the row 312. The type and number of sheets displayed in the column 313 varies with each job. FIG. 3A shows three types of sheets, including A4-size plain sheets having a basis weight of 100 gsm.

Display areas 317 to 322 represent time periods in which the sheets displayed in the column 313 are to be consumed, each in the form of a band. The display areas 317 to 322 are displayed in different colors or by different hatchings, according to the remaining amount of sheets. In the example illustrated in FIG. 3A, the display area 321 is displayed with hatching different from that of the display areas 317, 318, 319, 320, and 322.

The hatching of the display areas 317, 318, 319, 320, and 322 indicates that print sheets exist during printing, whereas the hatching of the display area 321 indicates that occurrence of paper-out during printing has been predicted by the paper-out prediction section 207.

In a case where the remaining amount of sheets in a sheet feeder has been changed, e.g. when the operator has replenished the sheet feeder with sheets, or when the operator has performed sheet replacement for the sheet feeder, the display areas are updated according to the changed amount of sheets.

By referring to the above display areas, the operator can check in advance when and which type of sheets is predicted to run short.

An operator schedule 330 indicates schedules of operators of the image forming apparatus 110. In the operator schedule 330, a horizontal line 331 represents time with tick marks indicative of times. A column 332 displays the operators. Although in FIG. 3A, only one operator "operator A" is displayed in the column 332, in a case where a plurality of operators use the image forming apparatus 110, they are displayed in the column 332.

A schedule area 334 displays a schedule of an operator displayed at a corresponding position in the column 332. In FIG. 3A, there is illustrated a state in which the schedule of the operator has not been input to the schedule area 334. The operator can tap a desired location of the schedule area 334 to thereby display the dialog screen 400 shown in FIG. 3B, for entering his/her absence schedule.

FIG. 3B shows the dialog screen 400 displayed when the schedule area 334 in FIG. 3A is tapped, by way of example. A start time 401 indicates a start time of the absence schedule, and an end time 402 indicates an end time of the same.

The operator is capable of inputting desired time points as the start time and the end time using a software keyboard, not shown, or ten keys provided on the console panel 120. In FIG. 3B, 11:00 is designated as a start time of the absence of the operator, and 12:00 is designated as an end time of the absence thereof. In this case, a time period in which the operator cannot perform replenishment or replacement of sheets is from 11:00 to 12:00.

If a confirmation button 410 is pressed, an absence schedule of the operator input at the time is finalized, and is stored in the RAM 113. Then, the dialog screen 400 is closed, causing the screen to return to the schedule screen 300, and an order changing process, described hereinafter, is executed.

If a cancel button 411 is pressed, the process for inputting the absence schedule of the operator is aborted to close the dialog screen 400, causing the screen to return to the schedule screen 300.

Figure 4A:
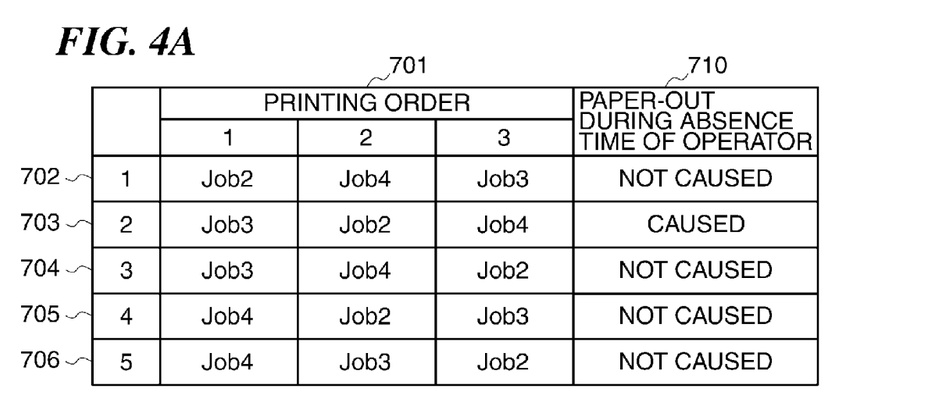
FIG. 4A is a view of a job order-changing table created by a CPU shown in FIG. 1.
Figure 4B:
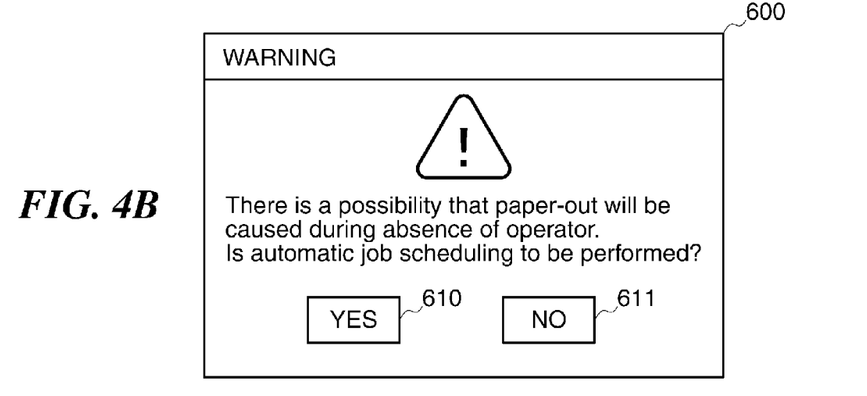
FIG. 4B is a view of a warning dialog.
Figure 4C:
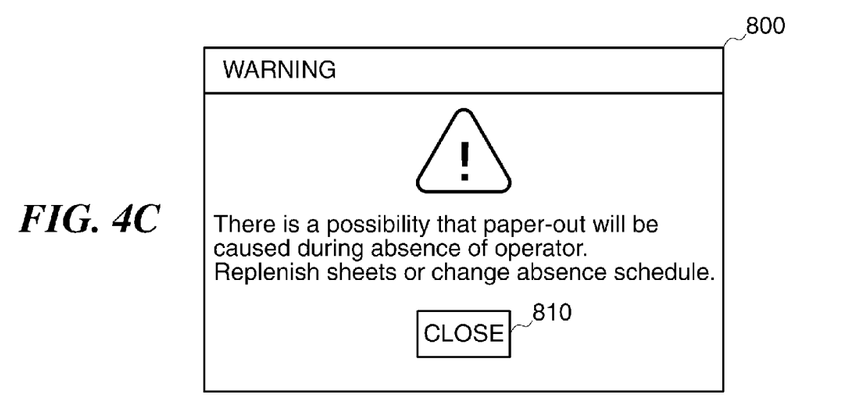
FIG. 4C is a view of a warning dialog different from the warning dialog illustrated in FIG. 4B.

FIG. 4A shows a job order-changing table created by the CPU 114 in FIG. 1, and FIGS. 4B and 4C show warning dialogs.

The job order-changing table shown in FIG. 4A is one created, by way of example, when the operator has input the absence schedule shown in FIG. 3B to the schedule screen 300 shown in FIG. 3A.

A column 701 indicates an execution order of jobs. Patterns 702 to 706 indicate possible job order-changing patterns, respectively.

Normally, a job being currently printed is not included in the jobs of which the order is to be changed. This is because if the job being currently printed is changed in its place in the execution order of jobs, there is a possibility that an output product of the job is mixed with an output product of a job other than the job.

For this reason, in FIG. 4A, Job 2 to Job 4 except Job 1 are to be changed in their order, and a total of five patterns from the pattern 702 to the pattern 706 are displayed. In the job order-changing table in FIG. 4A, the job order-changing patterns are indicated by respective sequences of job names sorted in earliest-first order.

A column 710 indicates, assuming that the execution order of jobs is changed according to the associated job order-changing pattern, whether or not paper-out will be caused (sheets will run out) during absence time of the operator.

Whether or not paper-out will be caused during absence time of the operator is determined for each job order-changing pattern according to which the execution order of jobs is assumed to be changed, by predicting a time point at which paper-out will be caused, using the paper-out prediction section 207, and comparing the predicted time and the absence time of the operator which has already been input.

In the case of the patterns 702 and 704 to 706 in FIG. 4A, if the execution order of the jobs is changed according thereto, no paper-out will be caused during the absence time of the operator.

However, in the case of the pattern 703, even if the execution order of the jobs is changed according thereto, paper-out will still be caused during the absence time of the operator.

FIG. 4B shows a warning dialog 600 displayed on the console panel 120 when paper-out will be caused during the time period input via the dialog screen 400 shown in FIG. 3B.

In FIG. 43, buttons 610 and 611 are displayed for the operator to determine whether or not to select automatic job scheduling. When one of the buttons 610 and 611 is pressed, the warning dialog 600 is closed.

If the button 610 is pressed, the CPU 114 determines that the operator has selected automatic job scheduling, whereas when the button 611 is pressed, the CPU 114 determines that the operator has not selected automatic job scheduling.

FIG. 4C shows a warning dialog 800 displayed on the console panel 120 when paper-out will be caused (sheets will run out) in all of the patterns in the job order-changing table in FIG. 4A.

A buttons 810 is used for closing the warning dialog 800. When the operator presses the buttons 810 after viewing a displayed warning message, the warning dialog 800 is closed. As described above, in the present embodiment, when it is impossible to change the execution order of the jobs managed by the print queue 203 such that predicted time will not come during a designated time period, a warning indicating that the predicted time will come during the designated time period is displayed on the console panel 120, which is a display section.

Figure 5:
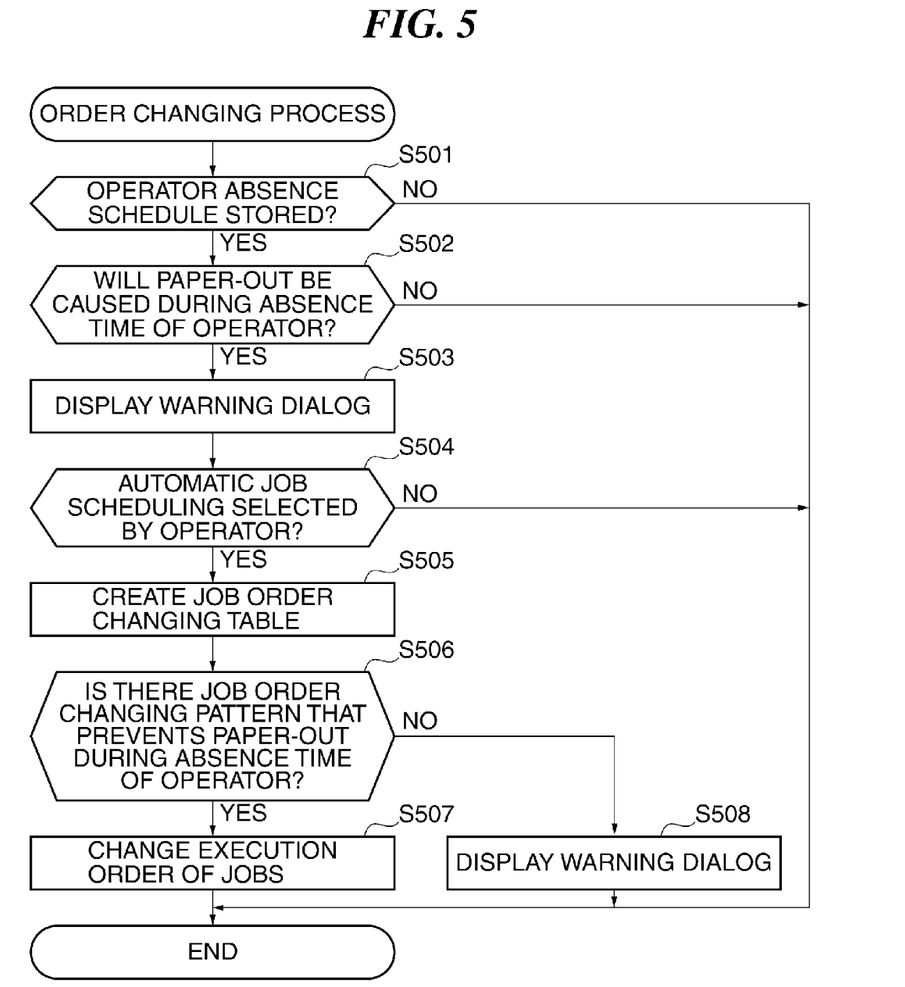
FIG. 5 is a flowchart of an order changing process executed by the CPU shown in FIG. 1.

FIG. 5 is a flowchart of the order changing process executed by the CPU 114 appearing in FIG. 1.

The order changing process shown in FIG. 5 is executed when the confirmation button 410, described with reference to FIG. 3B, is pressed on the dialog screen 400.

Referring to FIG. 5, first, it is determined whether or not the absence schedule of the operator is stored in the RAM 113 (step S501).

If it is determined in the step S501 that the absence schedule of the operator is not stored in the RAM 113 (NO to the step S501), the present process is immediately terminated.

On the other hand, if it is determined in the step S501 that the absence schedule of the operator is stored in the RAM 113 (YES to the step S501), it is determined whether or not paper-out will be caused during the absence time of the operator (step S502).

If it is determined in the step S502 that paper-out will not be caused during the absence time of the operator (NO to the step S502), the present, process is immediately terminated.

On the other hand, if it is determined in the step S502 that paper-out will be caused during the absence time of the operator (YES to the step S502), the warning dialog 600, described with reference to FIG. 4B, is displayed (step S503).

Next, it is determined whether or not the operator has pressed the button 610 on the warning dialog 600 in FIG. 4B, i.e. whether or not the operator has selected automatic job scheduling (step S504).

If it is determined in the step S504 that the operator has not selected automatic job scheduling, more specifically, has selected not to perform automatic job scheduling (the button 611 has been pressed) (NO to the step S504), the present process is immediately terminated.

On the other hand, if it is determined in the step S504 that the operator has selected automatic job scheduling (YES to the step S504), the job order-changing table, described with reference to FIG. 4A, is created (step S505).

Then, it is determined, with reference to the created job order-changing table, whether or not there is a job order-changing pattern which prevents paper-out from being caused during the absence time of the operator (step S506).

If it is determined in the step S506 that there is no job order-changing pattern which prevents paper-out from being caused during the absence time of the operator (NO to the step S506), the warning dialog 800, described with reference to FIG. 4C, is displayed (step S508), followed by terminating the present process.

On the other hand, if it is determined in the step S506 that there is a job order-changing pattern which prevents paper-out from being caused during the absence time of the operator (YES to the step S506), the job order automatic changing section 210 is caused to change the execution order of the jobs according to the job order-changing pattern which prevents paper-out from being caused during the absence time of the operator (step S507), followed by terminating the present process.

By execution of the order changing process in FIG. 5, described above, it is possible to display the absence schedule of the operator together with a printing schedule. Further, when it is determined that paper-out will be caused during the absence time of the operator, it is possible to automatically change the execution order of the jobs to thereby avoid paper-out from being caused during the absence time of the operator. This enables the operator to reduce a possibility of occurrence of downtime, and hence user friendliness of the image forming apparatus is improved.

Note that when there are a plurality of job order-changing patterns which prevent paper-out from being caused during the absence time of the operator, the CPU 114 may select one of the job order-changing patterns, which is displayed at a highest row in the job order-changing table. Alternatively, a dialog 1200 shown in FIG. 6 may be displayed to prompt the operator to select one of job order-changing patterns (job execution orders) shown therein.

Figure 6:
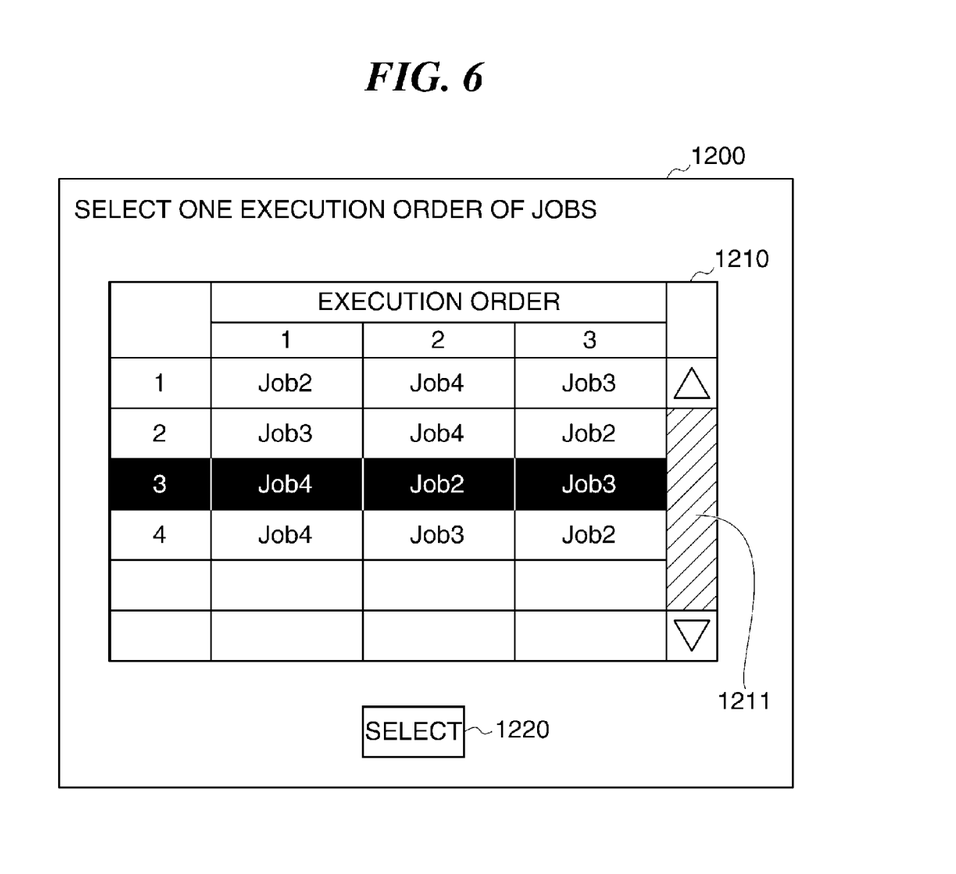
FIG. 6 is a view of a dialog displayed on the console panel in FIG. 1.

FIG. 6 shows the dialog 1200 displayed on the console panel 120 in FIG. 1.

In the dialog 1200, a list 1210 displays the job order-changing patterns which prevent paper-out from being caused during the absence time of the operator.

In the dialog 1200, the four job order-changing patterns are displayed which are determined to prevent paper-out from being caused during the absence time of the operator, out of the patterns displayed in the column 710 in the job order-changing table shown in FIG. 4A.

Further, by touching a location on the list 1210, where a desired one of the job order-changing patterns is displayed, the operator can select the desired job order-changing pattern. The selected job order-changing pattern is displayed in a highlighted manner (in reverse video).

FIG. 6 shows a case where the job order-changing pattern of "Job 4, Job 2, Job 3" is selected, by way of example. Further, when the number of job order-changing patterns to be displayed in the list 1210 is larger than the number of job order-changing patterns capable of being displayed in the list 1210 at a time, a scroll bar 1211 is used.

By operating the scroll bar 1211, the operator can cause all of the job order-changing patterns to be displayed in a scrolled manner. When a selection button 1220 is pressed, a job order-changing pattern currently selected in the list 1210 is finalized as the job order-changing pattern selected by the operator, followed by closing the dialog 1200.

As described above, in the present embodiment, when there are a plurality of patterns for changing the execution order of the jobs such that a predicted time of paper-out (running out of sheets) will not come during a designated time period, the execution order of the jobs is changed using one of the patterns selected by the operator.

Figure 7:
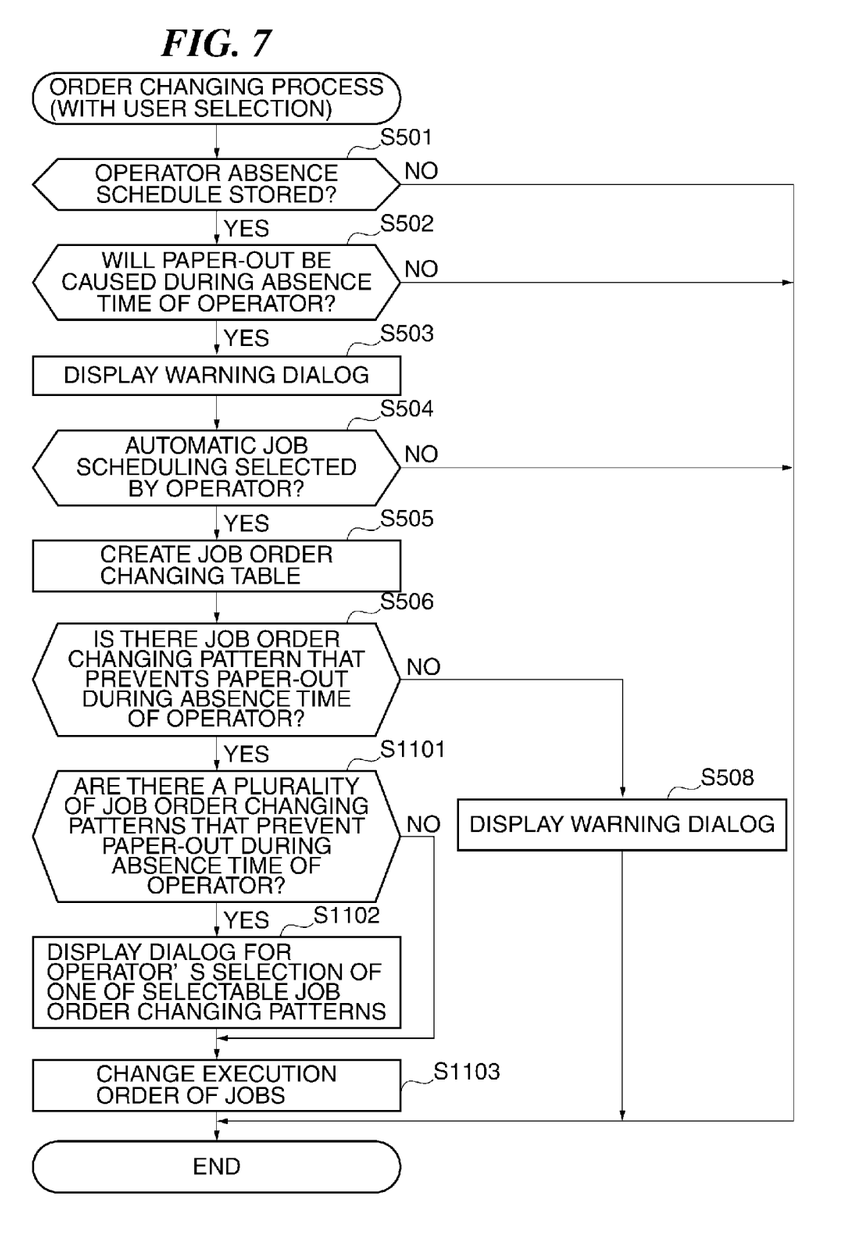
FIG. 7 is a flowchart of an order changing process (with user selection) executed by the CPU shown in FIG. 1.

FIG. 7 is a flowchart of an order changing process (with user selection) executed by the CPU 114 shown in FIG. 1.

Steps S501 to S506, and step S508 in FIG. 7 are the same as those in FIG. 5, and hence a description will be given starting from the affirmative answer to the question of the step S506.

If it is determined in the step S506 that there is a job order-changing pattern which prevents paper-out from being caused during the absence time of the operator (YES to the step S506), it is determined whether or not there are a plurality of job order-changing patterns which prevent paper-out from being caused during the absence time of the operator (step S1101).

If it is determined in the step S1101 that there is only one job order-changing pattern which prevents paper-out from being caused during the absence time of the operator (NO to the step S1101), the job order automatic changing section 210 is caused to change the execution order of the jobs according to the only one job order-changing pattern (step S1103), followed by terminating the present process.

On the other hand, if it is determined in the step S1101 that there are a plurality of job order-changing patterns which prevent paper-out from being caused during the absence time of the operator (YES to the step S1101), the CPU 114 displays the dialog 1200 shown in FIG. 6, and waits for the operator to select one of the job order-changing patterns (step S1102).

When the operator selects one of the job order-changing patterns, the CPU 114 causes the job order automatic changing section 210 to change the execution order of the jobs according to the selected one of the job order-changing patterns by the operator (step S1103), followed by terminating the present process.

By execution of the above-described order changing process in FIG. 7, when it is determined that paper-out will be caused during the absence time of the operator, and there are a plurality of job order-changing patterns which prevent paper-out from being caused during the absence time of the operator, the job order-changing patterns are displayed in a list form, for enabling the operator to select the most desirable one of the job order-changing patterns. This makes it possible to improve user friendliness of the image forming apparatus.

Figure 8A:
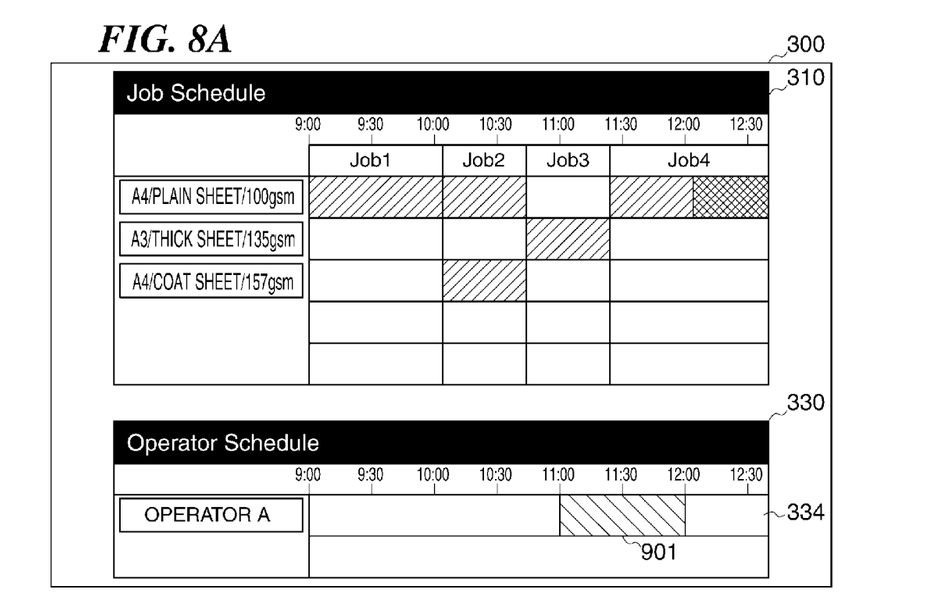
FIG. 8A is a view of the schedule screen displayed after execution of the order changing process in FIG. 5.
Figure 8B:
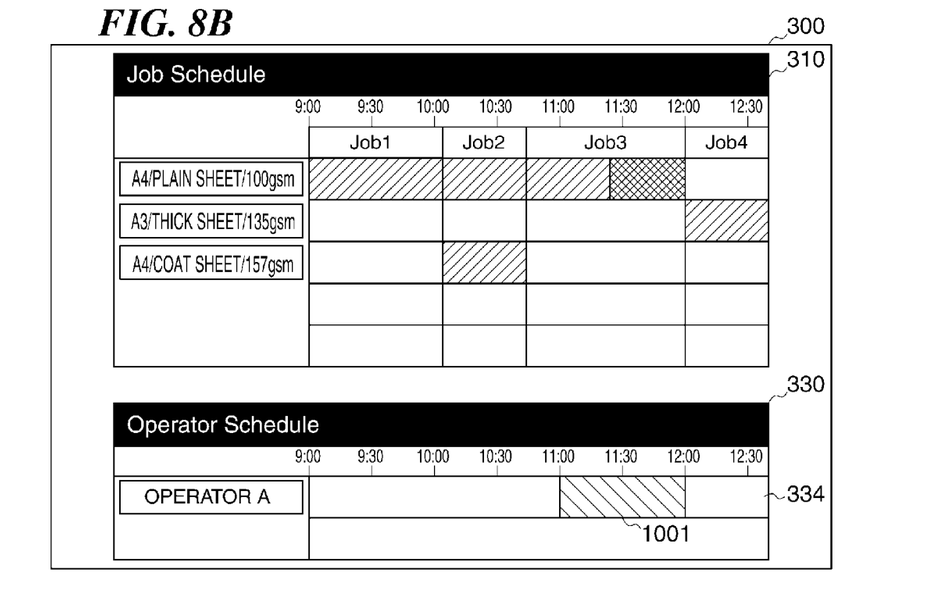
FIG. 8B is a view of the schedule screen displayed after execution of the order changing process in FIG. 7.

FIGS. 8A and 8B show respective examples of the schedule screen 300 displayed after execution of the order changing process in FIG. 5 or 7.

FIG. 8A shows an example of the schedule screen 300 displayed in a case where the execution order of the jobs has been changed by the order changing process since the operator has selected automatic job scheduling.

The schedule screen 300 shown in FIG. 8A is distinguished from the schedule screen 300 shown in FIG. 3A in that it displays an absence schedule 901 input to the schedule area 334 by the operator. Further, the schedule screen 300 in FIG. 8A shows the job schedule 310 in a state in which as a result of execution of the step S507 for changing the execution order of the jobs. Job 3 and Job 4 have been changed in execution order, whereby paper-out is prevented from being caused during the absence time of the operator.

FIG. 8B shows the schedule screen 300 displayed in a case where the execution order of the jobs has not been changed by the order changing process since the operator has not selected automatic job scheduling.

The schedule screen 300 shown in FIG. 8B is distinguished from the schedule screen 300 shown in FIG. 3A in that it displays an absence schedule 1001 input to the schedule area 334 by the operator.

The schedule screen 300 in FIG. 8B shows that paper-out will be caused during the absence time of the operator since changing the execution order of the jobs has not been selected.

Although in the order changing process in FIG. 7, when there are a plurality of job order-changing patterns, the job order-changing patterns are simply displayed in a list form, they may be displayed in a list form according to priority criteria set by the operator.

Figure 9:
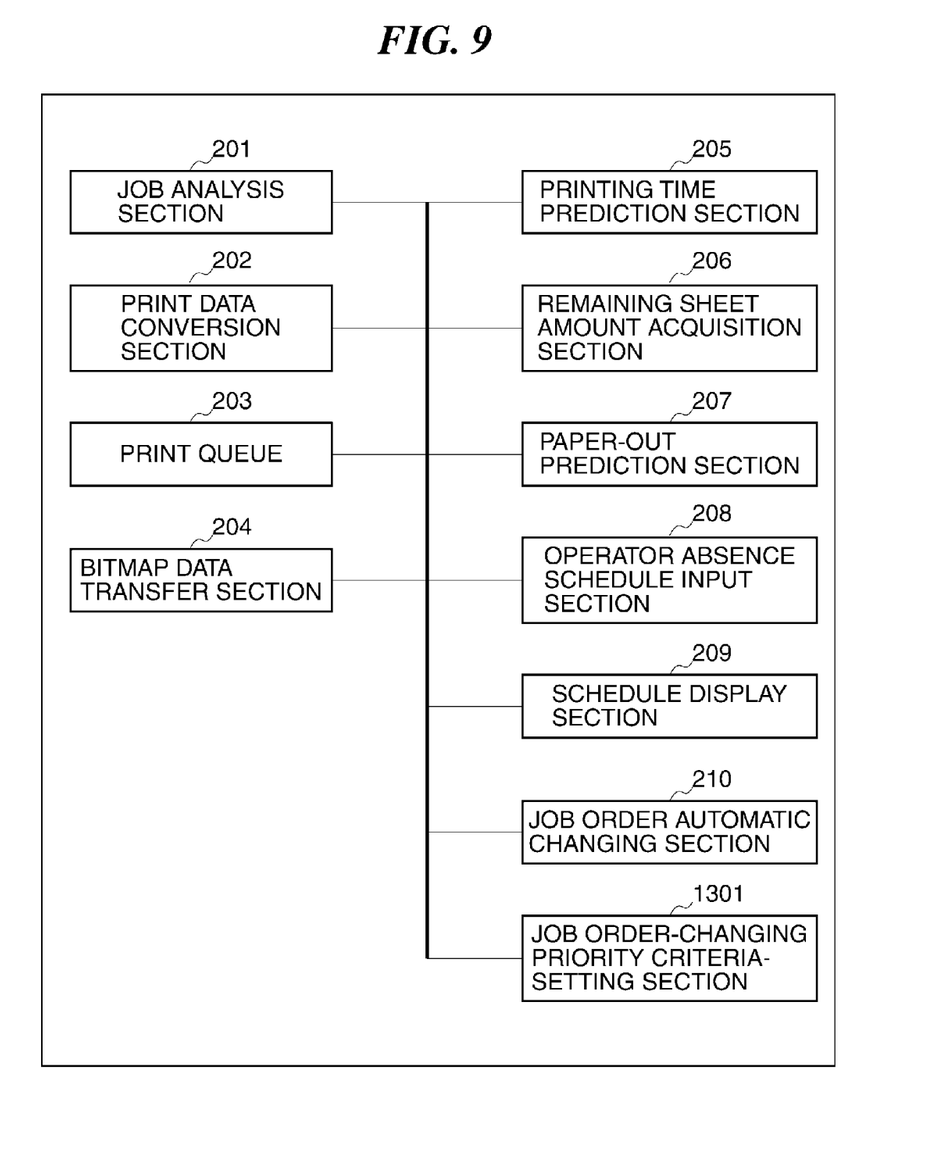
FIG. 9 is a block diagram of the software configuration of an image forming apparatus according to a second embodiment of the present invention, which displays a list of jobs in an order according to priority criteria set by the operator.

FIG. 9 is a block diagram of the software configuration of an image forming apparatus according to a second embodiment of the present invention, which displays job order-changing patterns in a list form according to priority criteria set by the operator.

The software configuration illustrated in FIG. 9 is distinguished from the software configuration illustrated in FIG. 2 only in that it includes a print job order-changing priority criteria-setting section 1301 as a newly added component. The second embodiment has the same configuration as that of the first embodiment in the other respects.

The job order-changing priority criteria-setting section 1301 displays a dialog screen, described hereinafter with reference to FIGS. 10A and 10B, and receives, from the operator, a setting of priority criteria according to which a job order-changing pattern is to be preferentially selected from a plurality of job order-changing patterns.

Figure 10A:
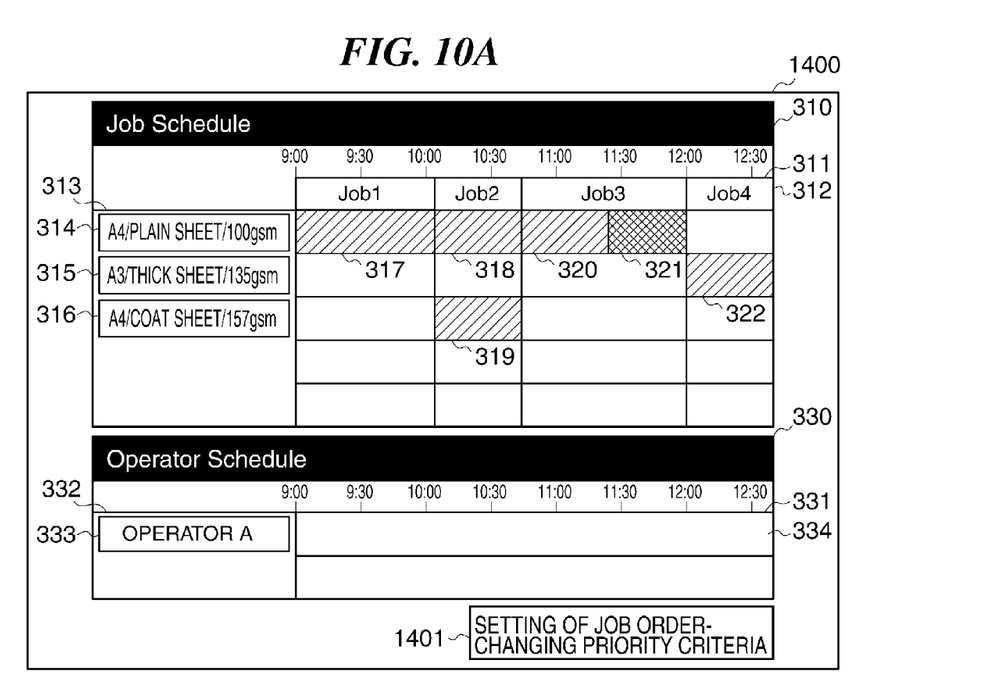
FIG. 10A is a view of a schedule screen which is displayed on the console panel appearing in FIG. 1, to show the list in the order according to the priority criteria set by the operator.

FIG. 10A shows a schedule screen 1400 which is displayed on the console panel appearing in FIG. 1 120, and displays the job order-changing patterns in a list form according to the priority criteria set by the operator. FIG. 10B shows a dialog screen 1500 displayed on the console panel 120 by the job order-changing priority criteria-setting section 1301.

The schedule screen 1400 shown in FIG. 10A has a job order changing priority criteria-setting button 1401 newly added to the schedule screen 300 shown in FIG. 3A.

Figure 10B:
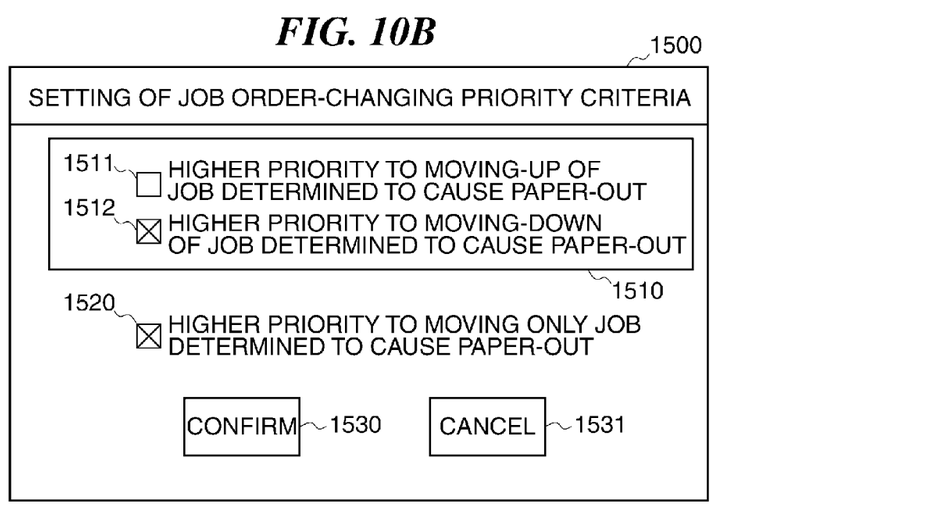
FIG. 10B is a view of a dialog screen displayed on the console panel by a job order-changing priority criteria-setting section.

When the job order changing priority criteria-setting button 1401 is pressed by the operator, the dialog screen 1500 shown in FIG. 10B is displayed.

An option group 1510 is displayed on the dialog screen 1500 shown in FIG. 10B, for prompting the operator to select between a setting of giving a higher priority to moving-up (advancing) of a job determined to cause paper-out (running out of sheets) and a setting of giving a higher priority to moving-down (delaying) of the job.

To make a setting of giving a higher priority to moving-up of a job determined to cause paper-out during the absence time of the operator, the operator checks a check box 1511.

Here, the term "moving-up" is intended to mean that when the execution order of the jobs is changed, a print start time of the job determined to cause paper-out is made earlier than a printing time scheduled before the changing the order.

On the other hand, to make a setting of giving a higher priority to moving-down of the job determined to cause paper-out during the absence time of the operator, the operator checks a check box 1512.

Here, the term "moving-down" is intended to mean that when the execution order of the jobs is changed, the print start time of the job determined to cause paper-out is made later than the printing time scheduled before the changing the order.

The check boxes 1511 and 1512 are set in a mutually exclusive manner, and hence it is impossible to check both of the check boxes.

Further, to make a setting of giving a higher priority to moving only the job determined to cause paper-out during the absence time of the operator, the operator checks a check box 1520.

In this case, the moving-up or moving-down of only the job determined to cause paper-out during the absence time of the operator is preferentially executed while maintaining the early-late relationship of the jobs other than the job determined to cause paper-out.

FIG. 10B shows a state in which the check boxes 1512 and 1520 are checked.

When a confirmation button 1530 is pressed, settings of job order changing priority criteria input at the time are finalized, and are stored in the HDD 115 or the RAM 113. This closes the dialog screen 1500, causing the screen to return to the schedule screen 1400. Thus, the operator is capable of setting priority criteria in advance.

When a cancel button 1531 is pressed, the process for setting the job order changing priority criteria is aborted, and the dialog screen 1500 is closed, causing the screen to return to the schedule screen 1400.

Figure 11:
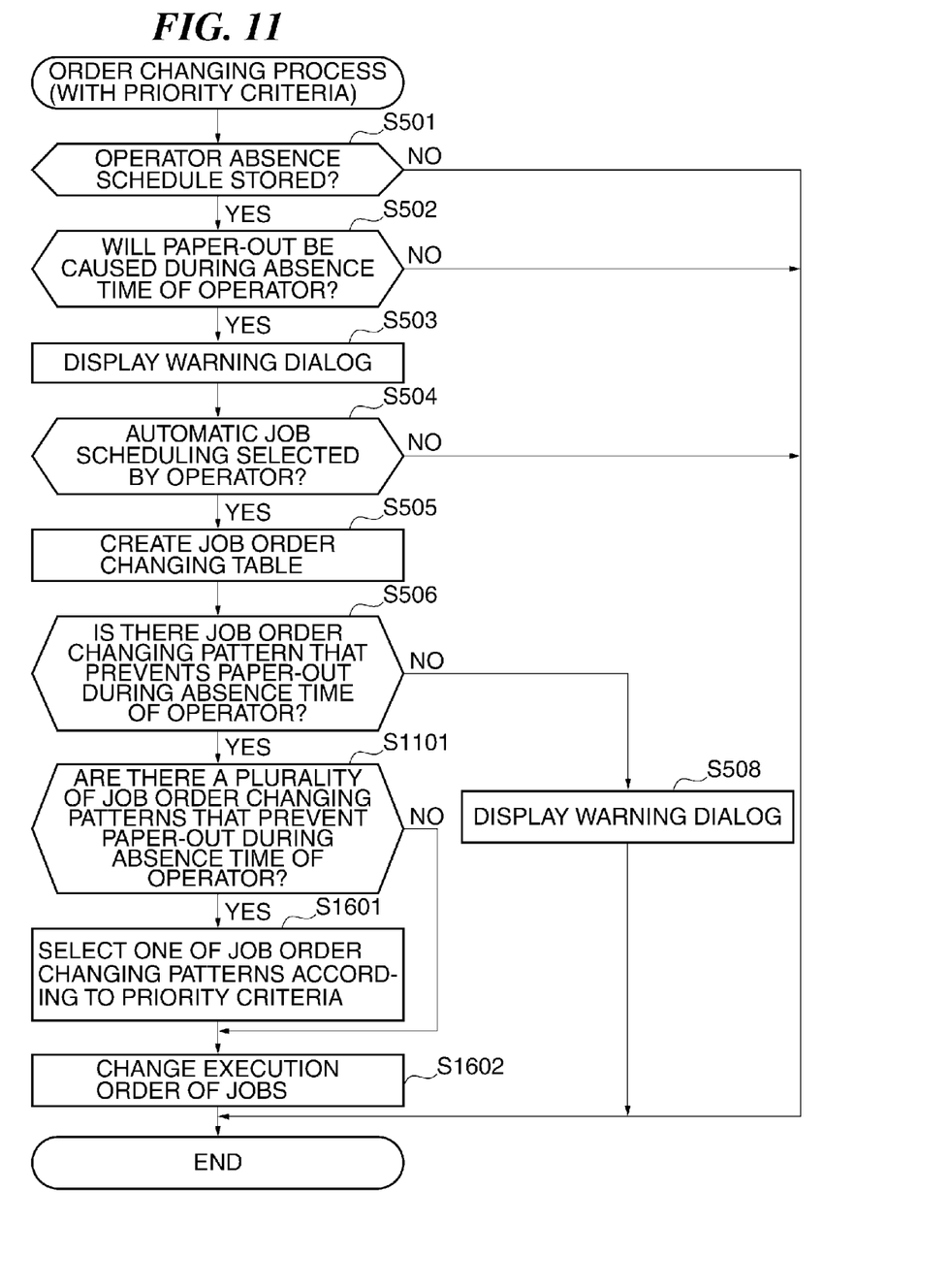
FIG. 11 is a flowchart of an order changing process (with priority criteria) executed by the CPU shown in FIG. 1.

FIG. 11 is a flowchart of an order changing process (with priority criteria) executed by the CPU 114 shown in FIG. 1.

The steps S501 to S506, and the step S508 in FIG. 11 are the same as those in FIG. 5, and the step S1101 in FIG. 11 is the same as that in FIG. 7. Therefore, a description will be given starting from the step S1101.

It is determined whether or not there are a plurality of job order-changing patterns which prevent paper-out from being caused during the absence time of the operator (step S1101).

If the answer to the question of the step S1101 is negative (NO), the same processing as the processing in FIG. 7 is performed. More specifically, if it is determined in the step S1101 that there is only one job order-changing pattern which prevents paper-out from being caused during the absence time of the operator (NO to the step S1101), the execution order of the jobs is changed according to the only one job order-changing pattern (step S1602), followed by terminating the present process.

On the other hand, if it is determined in the step S1101 that there are a plurality of job order-changing patterns which prevent paper-out from being caused during the absence time of the operator (YES to the step S1101), one job order-changing pattern is selected from the job order-changing patterns according to the priority criteria set by the operator via the job order-changing priority criteria-setting section 1301 (step S1601).

Then, the execution order of the jobs is changed according to the one job order-changing pattern selected in the above-described step S1601 (step S1602), followed by terminating the present process.

Next, a supplementary description will be given of the operation of the above-described order changing process (with priority criteria) based on an example. First, let it be assumed as a precondition that on the dialog screen 1500, the operator has checked the check boxes 1512 and 1520 as shown in FIG. 10B, by way of example, and has pressed the confirmation button 1530 to thereby set the job order changing priority criteria.

Here, if the operator inputs the absence schedule shown in FIG. 3B to the printing schedule shown in FIG. 10A, in the step S505, there is created the job order-changing table as shown in FIG. 4A.

As shown in the column 701, there are a plurality of patterns for changing the execution order of the jobs, which have been determined to prevent paper-out from being caused during the absence time of the operator, and hence the process proceeds to the step S1601.

In the step S1601, first, according to one priority criterion set by the operator, job order-changing patterns are preferentially selected which move down the job determined to cause paper-out during the absence time of the operator.

Here, since the job determined to cause paper-out during the absence time of the operator is Job 3, job order-changing patterns which move down Job 3 in the execution order of the jobs are preferentially selected. In FIG. 7, the patterns 702 and 705 correspond to the job order-changing patterns.

Further, according to the other priority criterion set by the operator, one of the job order-changing patterns is preferentially selected which moves only the job determined to cause paper-out during the absence time of the operator.

In the pattern 705, the early-late relationship of Job 2 and Job 4 is changed. On the other hand, in the pattern 702, only Job 3 is moved while maintaining the early-late relationship of Job 2 and Job 4. Therefore, in the step S1601, the pattern 702 is selected as the job order-changing pattern to be used.

As described above, in the present embodiment, when there are a plurality of patterns for changing the execution order of the jobs such that the predicted time of paper-out will not come during a designated time period, the execution order of the jobs is changed according to priority criteria set in advance by the operator.

By execution of the above-described order changing process in FIG. 11, even when there are a plurality of job order-changing patterns which prevent paper-out from being caused during the absence time of the operator, it is possible to automatically change the execution order of the jobs according to the priority criteria set in advance by the operator. This makes it possible to save the operator time and labor for manually selecting the most desirable change, and improve user friendliness of the image forming apparatus.

Although the above-described order changing processes in FIGS. 5, 7, and 11 are executed when the confirmation button 410 is pressed on the dialog screen described with reference to FIG. 3B, they may be executed using any of events, such as "start of management of a new job by the print queue 203", "manual change of the execution order of the jobs", and "a shift in the printing schedule of the jobs being caused by occurrence of an error", as a trigger.

According to the above-described embodiments, it is possible to display an absence schedule of the operator together with a printing schedule thereof.

Further, when paper-out is to be caused during the absence time of the operator, it is possible to avoid the same from being caused by automatically changing the execution order of the jobs.

This makes it possible to improve user friendliness of the image forming apparatus since the operator can reduce a possibility of occurrence of downtime.

Further, when paper-out is to be caused during the absence time of the operator, and there are a plurality of job order-changing patterns which prevent paper-out from being caused during the absence time of the operator, the job order-changing patterns are displayed in a list form. This makes it possible for the operator to select the most desirable one of the job order-changing patterns, so that it is possible to improve user friendliness of the image forming apparatus.

Furthermore, also when there are a plurality of job order-changing patterns which prevent paper-out from being caused during the absence time of the operator, it is possible to automatically change the execution order of the jobs according to priority criteria set in advance by the operator for selection of a job order-changing pattern. This makes it possible to save the operator time and labor for manually selecting the most desirable change, whereby it is possible to improve user friendliness of the image forming apparatus.

According to the above-described embodiment, it is possible to provide an image forming apparatus which, when it is possible to change the execution order of jobs such that a predicted time at which replenishment or replacement of a consumable becomes necessary will not come during a time period designated by an operator during which the operator cannot replenish or replace the consumable (YES to the step S506), is capable of changing the execution order of the jobs such that the predicted time will not come during the designated time period (step S507), and therefore is capable of suppressing occurrence of downtime caused by incapability of the operator for replenishing or replacing the consumable, a method of controlling the image forming apparatus, and a storage medium.

Other Embodiments

Embodiments of the present invention can also be realized by a computer of a system or apparatus that reads out and executes computer executable instructions recorded on a storage medium (e.g., non-transitory computer-readable, storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-114183 filed May 30, 2013, which is hereby incorporated by reference herein in its entirety.

What is claimed is:

1. An image forming apparatus comprising:
at least one processor; and
at least one memory comprising computer code executable by the at least one processor, the executable computer code comprising:
a first time prediction unit configured to predict a time period required from start to completion of execution of jobs;
a queue management unit configured to manage an execution order of the jobs;
a second time prediction unit configured to predict a time at which replenishment or replacement of a consumable to be consumed by the execution of the jobs becomes necessary;
an input unit configured to have a time period input thereto during which an operator who is to replenish or replace the consumable cannot replenish or replace the consumable; and
an order changing unit configured to change the execution order of the jobs such that the time predicted by said second time prediction unit will not come during the input time period.

2. The image forming apparatus according to claim 1, further comprising a display section, wherein the at least one processor is configured to cause the display section, to display a warning indicating that the time predicted by said second time prediction unit will come during the input time period.

3. The image forming apparatus according to claim 1, wherein when there are a plurality of patterns for changing the execution order of the jobs such that the time predicted by said second time prediction unit will not come during the input time period, said order changing unit changes the execution order of the jobs according to priority criteria set in advance by the operator.

4. The image forming apparatus according to claim 1, wherein the consumable is at least one of consumables of sheets, toner, ink, staples, bookbinding pastes, and binders.

5. A method of controlling an image forming apparatus, comprising:
first predicting a time period required from start to completion of execution of jobs;
managing an execution order of the jobs;
second predicting a time at which replenishment or replacement of a consumable to be consumed by the execution of the jobs becomes necessary;
having a time period input during which an operator who is to replenish or replace the consumable cannot replenish or replace the consumable; and
changing the execution order of the jobs such that the time predicted in said second predicting will not come during the input time period.

6. The method according to claim 5, further comprising displaying a warning indicating that the time predicted in said second predicting will come during the input time period, on a display section.

7. The method according to claim 6, wherein when there are a plurality of patterns for changing the execution order of the jobs such that the time predicted in said second predicting will not come during the input time period, said changing includes changing the execution order of the jobs according to priority criteria set in advance by the operator.

8. The method according to claim 5, wherein the consumable is at least one of consumables of sheets, toner, ink, staples, bookbinding pastes, and binders.

9. A non-transitory computer-readable storage medium storing a computer-executable program for causing a computer to execute a method of controlling an image forming apparatus,
wherein the method comprises:
first predicting a time period required from start to completion of execution of jobs;
managing an execution order of the jobs;
second predicting a time at which replenishment or replacement of a consumable to be consumed by the execution of the jobs becomes necessary;
having a time period input during which an operator who is to replenish or replace the consumable cannot replenish or replace the consumable; and
changing the execution order of the jobs such that the time predicted in said second predicting will not come during the input time period.

* * * * *